United States Patent [19]
Yasuda et al.

[11] Patent Number: 5,655,467
[45] Date of Patent: Aug. 12, 1997

[54] TRANSPLANTER

[75] Inventors: Atuo Yasuda; Kazuo Seki; Tadashi Kondou; Hideo Nakajima; Tadayuki Shinko, all of Chayamachi, Japan

[73] Assignee: Yanmar Agricultural Equipment Co., Ltd., Japan

[21] Appl. No.: 588,092

[22] Filed: Jan. 18, 1996

[30] Foreign Application Priority Data

Jan. 20, 1995 [JP] Japan .................................. 7-026157

[51] Int. Cl.$^6$ .................................................. A01C 11/02
[52] U.S. Cl. ...................... 111/100; 111/903; 111/105
[58] Field of Search ................................. 111/100, 101, 111/105, 200, 903, 915, 919, 921, 922, 1.01

[56] References Cited

U.S. PATENT DOCUMENTS

| | | | |
|---|---|---|---|
| 4,145,980 | 3/1979 | Boots | 111/903 X |
| 4,333,096 | 6/1982 | Jenkins et al. | 111/903 X |
| 4,807,543 | 2/1989 | Paul | 111/100 |
| 5,215,550 | 6/1993 | Tesch, Jr. et al. | 111/100 |
| 5,247,761 | 9/1993 | Miles et al. | 111/100 |
| 5,320,649 | 6/1994 | Holland | 111/100 |
| 5,402,740 | 4/1995 | Kinoshita et al. | 111/921 X |

*Primary Examiner*—Terry Lee Melius
*Assistant Examiner*—Robert Pezzuto
*Attorney, Agent, or Firm*—Harold Gell

[57] ABSTRACT

A seedling planter mounted on a trailer is provided with means to sense the side walls of ridges of earth and a means to position the planter over ridges of earth in response to the ridge side wall sensing means by transporting the planter sideways from the for/aft center line of the trailer irrespective of the track of the trailer.

8 Claims, 17 Drawing Sheets

TRANSPLANTER

BACKGROUND OF THE INVENTION

1. Field of the Invention

The present invention relates to a transplanter used to plant vegetable seedlings in truck farms or to carry out similar agricultural works, engaging with the ground.

2. Prior Art

In general, planting units are mounted on vehicles or trailers hauled by tractors or the like, so as to form the transplanters. The prior art planting units are designed to be displaceable only in a vertical direction.

Whenever the transplanting trailers run along ridges, those units are controlled to rock up and down to follow upper surfaces of the ridges so that the seedlings are planted therein at a constant depth. However, the trailers or vehicles often sway sideways relative to ridges. In such an event, the planting units will fail to plant the seedlings in correct, for instance middle, zones of those ridges. This is one of the drawbacks in the prior art planting units.

SUMMARY OF THE INVENTION

Therefore, an object of the present invention is to provide an advanced transplanter that comprises at least one planting unit mounted on a trailer and displaceable sideways relative thereto, a pair of left and right ridge sensors attached to the planting unit, and a control means for moving the planting unit to slide transversely relative to the trailer, on the basis of signals transmitted from the sensors, so as to automatically adjust position of the planting unit into alignment with zones extending on and along adjacent ridges and having to be planted with seedlings. In operation of this transplanter, an operator need only to drive a tractor in a considerably rough manner to pull the trailer approximately along the ridges. The seedlings will be planted in middle zones of those ridges, without a fear of pushing down those which have been planted and are located near the planting units. The heads of vegetables such as cabbages that are heading up will be protected from the planting units which would otherwise damage them. Adjacent rows of any other vegetables will also be protected from damage when a ground between these rows is cultivated using plows in place of the planting units.

Another object of the present invention is to provide a transplanter that comprises at least one planting unit mounted on a trailer and displaceable sideways relative thereto, a pair of left and right inside ridge sensors attached to the planting unit, and the ridge sensors being capable of detecting inner slopes facing one another and belonging to adjacent ridges which have longitudinal zones and extend in parallel with each other, wherein a transverse position of the planting unit is controlled based on signals transmitted from the ridge sensors while the trailer is running, whereby said unit is caused to correctly follow the longitudinal zones where seedlings are to be planted. In operation of the transplanter just summarized above, the planting unit can maintain its correct position with respect to the ridges even if the trailer slightly skews relative thereto while running along same. Seedlings can be planted accurately in any desired zone on each ridge by the planting unit whose position is being controlled using signals from the ridge sensors. In contrast with ridge sensors detecting outer side slopes of adjacent ridges, the ridge sensors in this case make a more moderate response to such a temporary change in position of said unit. The planting unit will not react to said positional change so sharply as to cause 'hunting', but will smoothly follow the ridges to be planted with the seedlings. The ridge sensors in this case are located near the center of the trailer, so that they will be protected well from any obstacles that may be present near the sides of said trailer.

Still another object of the present invention is to provide a transplanter that comprises at least one planting unit mounted on a trailer and displaceable sideways relative thereto, a pair of left and right outside ridge sensors attached to the planting unit, and the ridge sensors being capable of detecting outer side slopes located at opposite sides of a plurality of adjacent ridges which have longitudinal zones and extend in parallel with each other, wherein a transverse position of the planting unit is controlled based on signals transmitted from the ridge sensors while the trailer is running, whereby said unit is caused to correctly follow the longitudinal zones where seedlings are to be planted. In operation, the ridge sensors located remote from each other in this case do cooperate with each other to detect even a slight sideways offset of the planting unit. The planting unit in this case makes a so quick response to said offset as to be controlled more sharply in position. Maintenance of those ridge sensors located away from the trailer body is easy.

Yet still another object of the present invention is to provide a transplanter that comprises at least one planting unit mounted on a trailer and displaceable sideways relative thereto, a pair of left and right ridge sensors attached to the planting unit; and the ridge sensors being switchable over between one position thereof to detect inner slopes facing one another and belonging to adjacent ridges and another position to detect outer slopes located at opposite sides of the adjacent ridges, which have longitudinal zones and extend in parallel with each other, wherein a transverse position of the planting unit is controlled based on signals transmitted from the ridge sensors while the trailer is running, whereby said unit is caused to correctly follow the longitudinal zones where seedlings are to be planted. Versatility of the ridge sensors is remarkably enhanced in this case, because they may be set selectively in any desired position. In one position, they will detect the inner slopes of two adjacent ridges. In another position, they will detect the outer slopes of two or more adjacent ridges, or alternatively detecting a left and right slopes of one broad ridge covered with two or planting units.

DETAILED DESCRIPTION OF THE PREFERRED EMBODIMENTS

Figure 1:
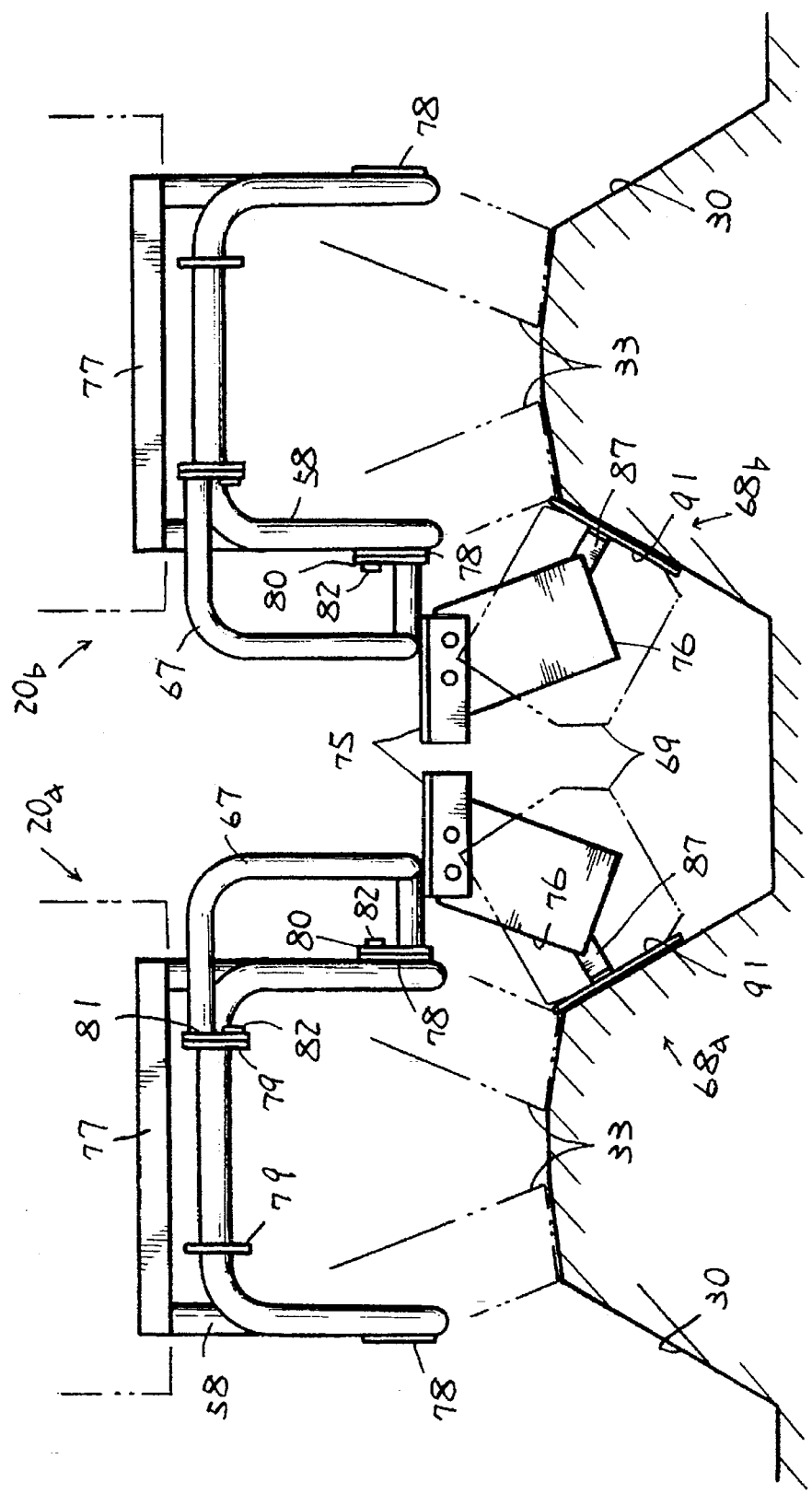
FIG. 1 is a rear elevation of inside ridge sensors incorporated in a transplanter, provided in an embodiment and shown in use.
Figure 2:
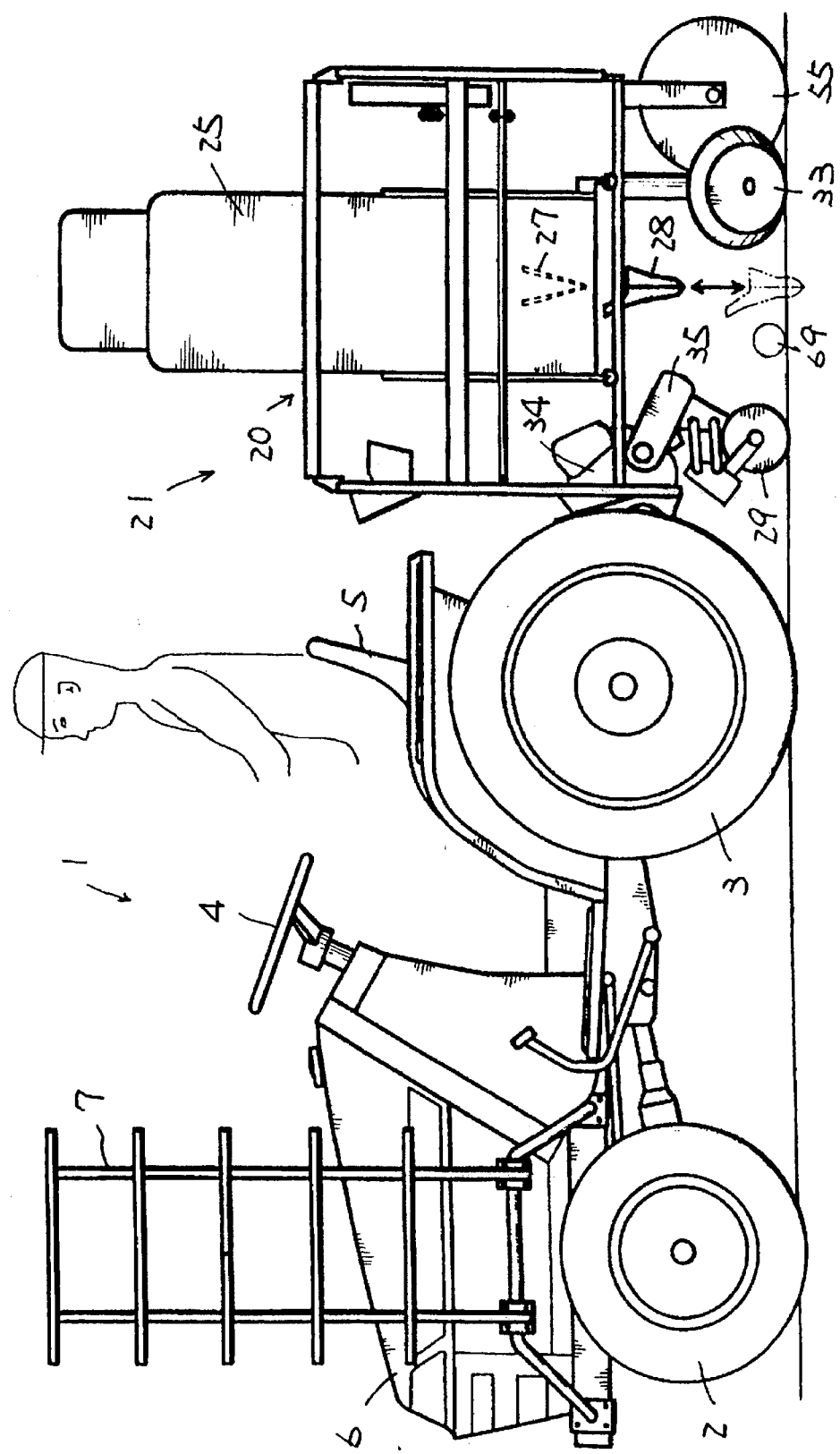
FIG. 2 is a side elevation of the transplanter shown together with a tractor.
Figure 3:
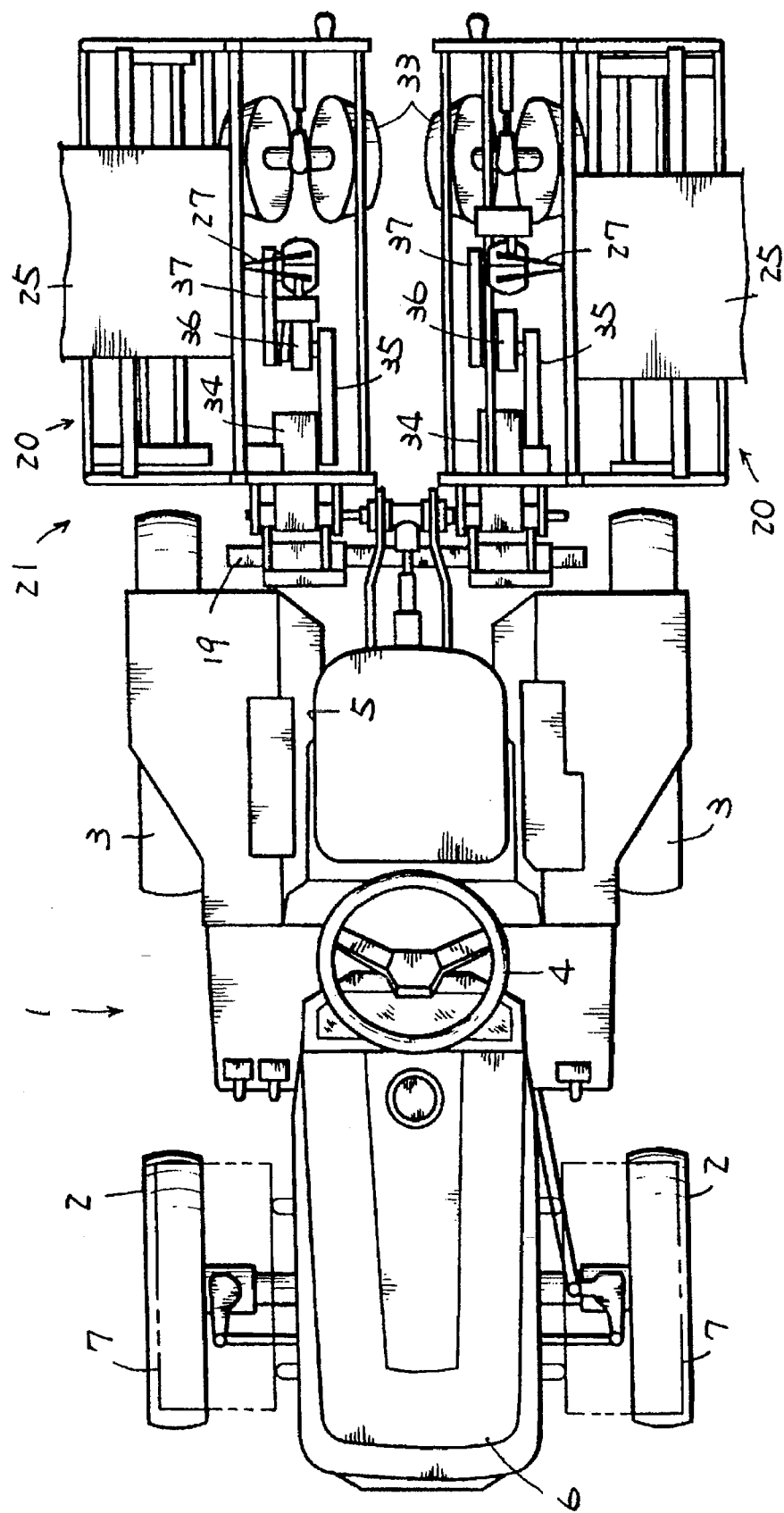
FIG. 3 is a plan view the transplanter also shown together with the tractor.
Figure 4:
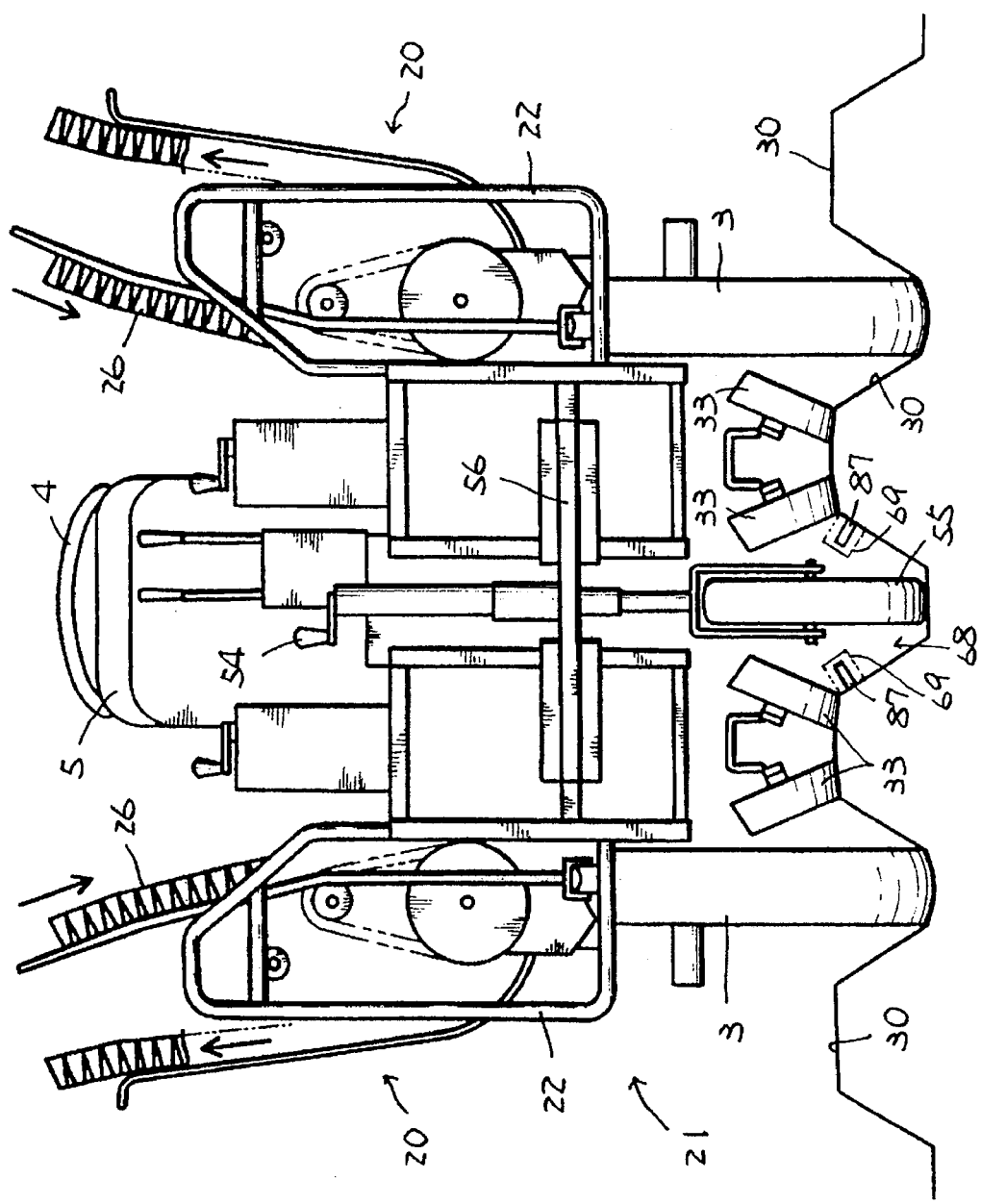
FIG. 4 is a rear elevation of the transplanter shown together with the tractor.

Now, the present invention will be described in more detail referring to some embodiments shown in the drawing.

In FIGS. 1 to 6 illustrating one embodiment, the reference numeral 1 generally denotes an automotive tractor having front traction wheels 2, rear traction wheels 3, steering wheel 4 and a seat 5. An operator will ride on and maneuver this tractor, usually sitting on its seat 5. Seedling racks 7 are disposed in front of the steering wheel 4 and beside a bonnet 6. An engine installed under the bonnet will drive the traction wheels 2 and 3 in reversible directions, with the front wheels 2 being steered by the steering wheel 4. Those traction wheels on the tractor may be replaced with a pair of left and right endless crawlers. An automatic steering system may be employed in the tractor, which system comprises a navigation sensor, an actuator and a controller receiving signals from the sensor and giving commands to the actuator. In such a case, the tractor will run itself correctly along the ridges.

Figure 7:
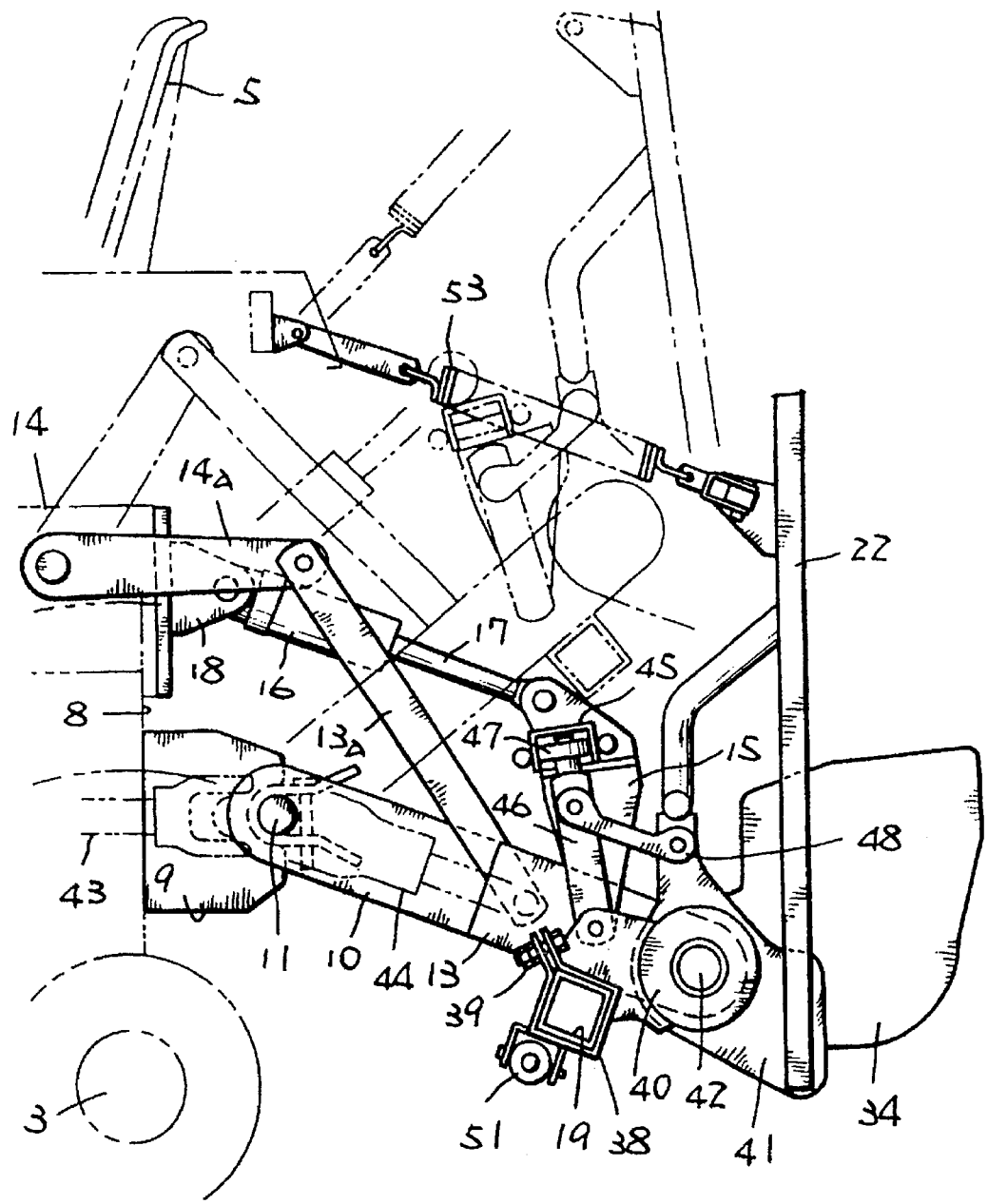
FIG. 7 is a side elevation of a joint that is disposed between the tractor and a trailer pulled thereby to carry the transplanter.
Figure 8:
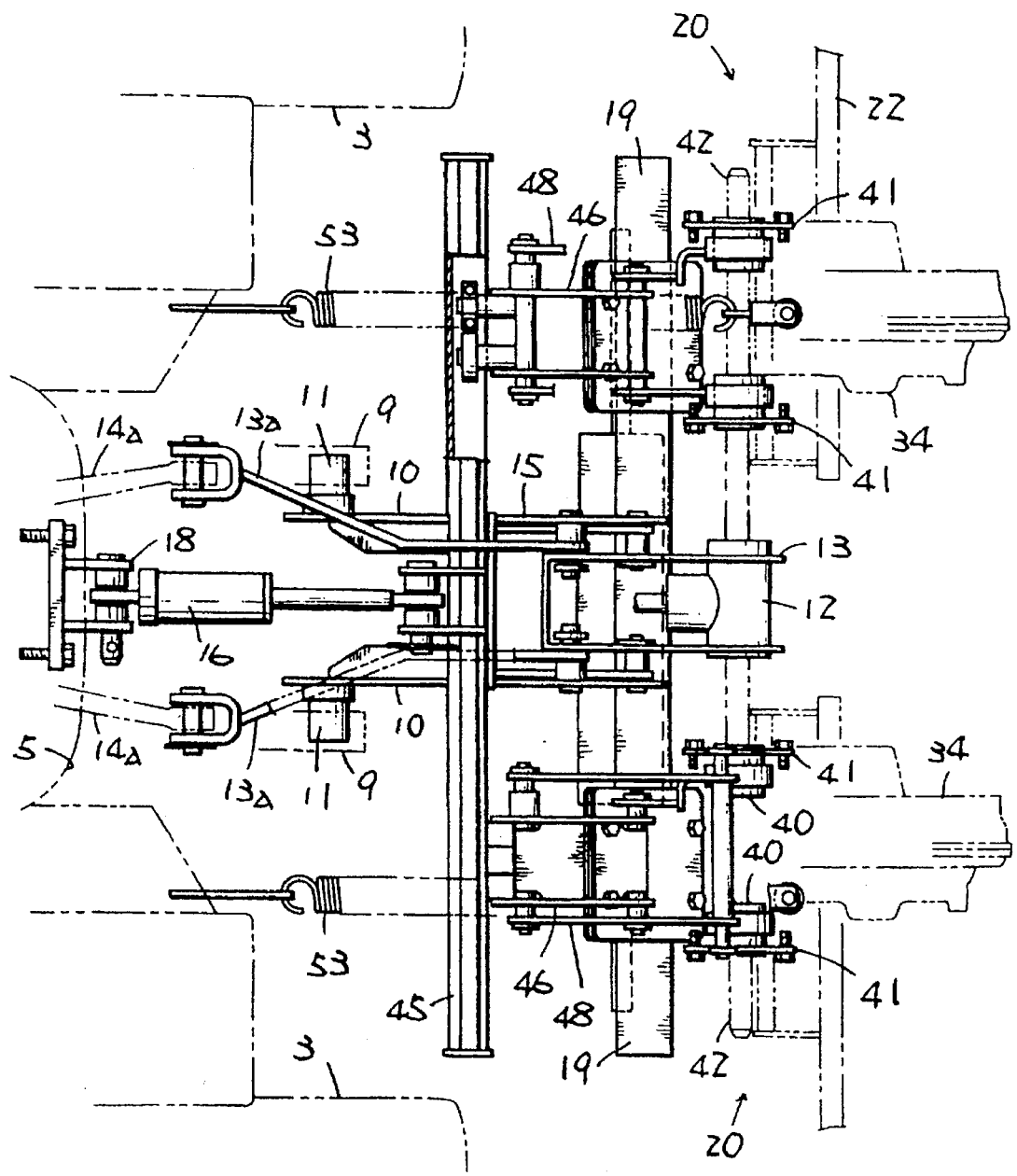
FIG. 8 is a plan view of the joint.
Figure 9:
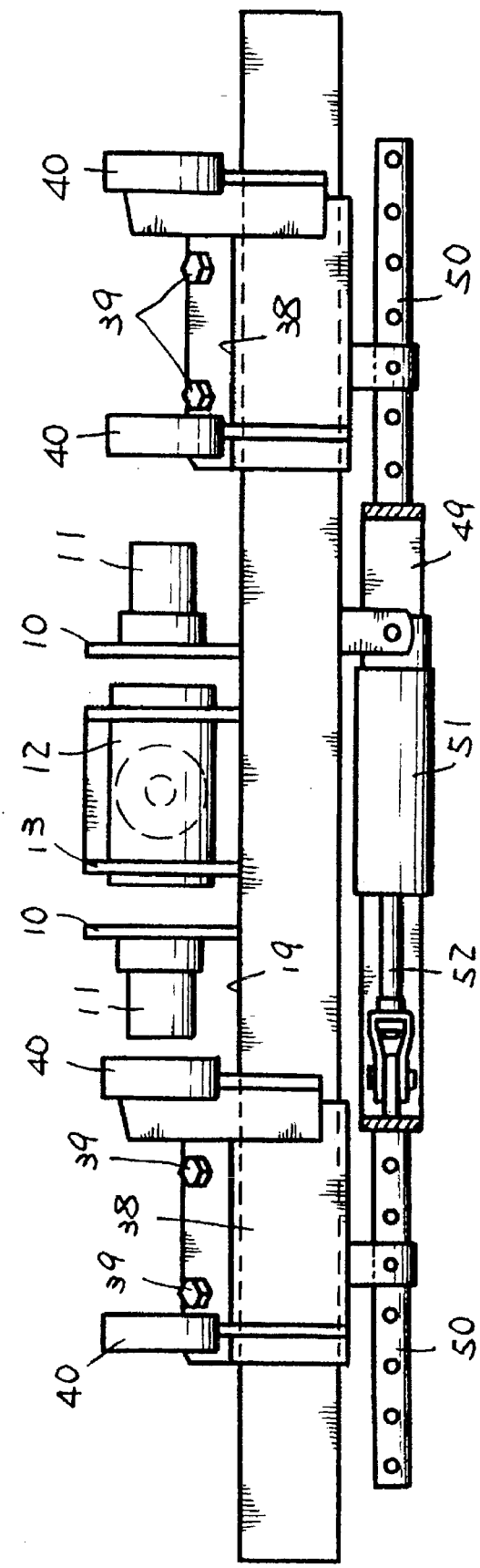
FIG. 9 is a rear elevation of a transverse hydraulic cylinder accompanying the joint.

As will be seen in FIGS. 7–9, the rear traction wheels 3 are disposed beside a main transmission housed in a case 8. A pair of left and right fulcrum brackets 9 that have frontal ends bolted to a rear face of the transmission case protrude rearwardly. Short transverse shafts 11 secured to frontal ends of lower links 10 are rotatably held in place by the brackets 9. Each lower link 10 can swing about its shaft 11 so that its rear end is rockable up and down. A T-shaped gear case 12 is attached by a hitch frame 13 to rear ends of the lower links 10, which are connected to a pair of lifting links 13a together with the hitch frame 13. Those lifting links are in turn operatively connected to arms 14a extending rearward from an oil-hydraulic cylinder 14 secured to a top surface of the transmission case 8. Each of linking frames 15 standing upright has a lower end operatively connected to lower links 10. The linking frame 15 has an upper end region operatively connected by a further oil-hydraulic cylinder 16 and its piston rod 17 to a hinge 18 secured to the transmission case 8, wherein said cylinder and rod constitute a top link. A tool bar 19, that is a hollow cylinder of square cross section, is welded to lower sides of intermediate portions of the lower links 10. Such a tool bar 19 extends transversely and horizontally in rear of and between the rear traction wheels 3.

Figure 10:
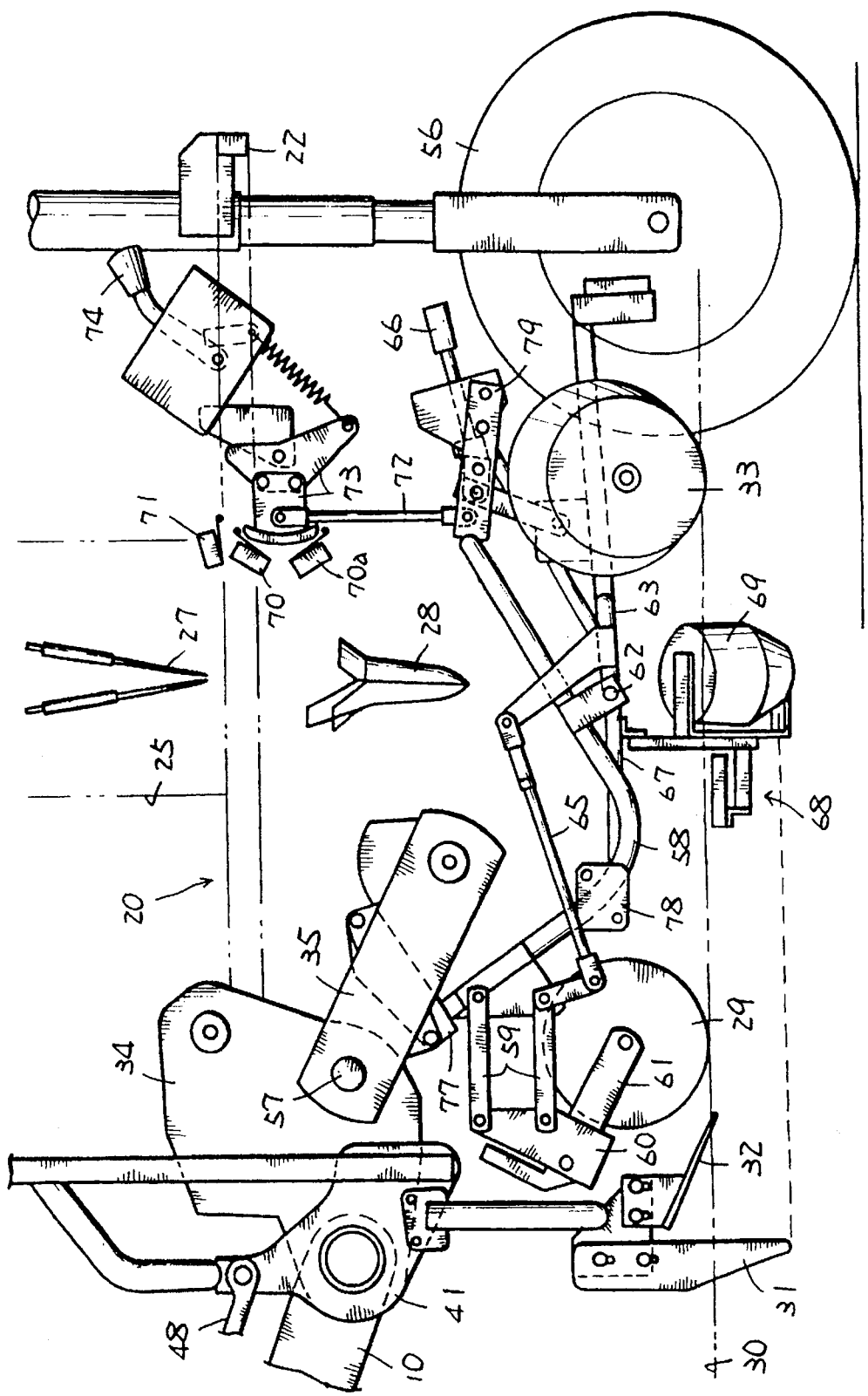
FIG. 10 is a side elevation of one of planting units incorporated in the transplanter.
Figure 11:
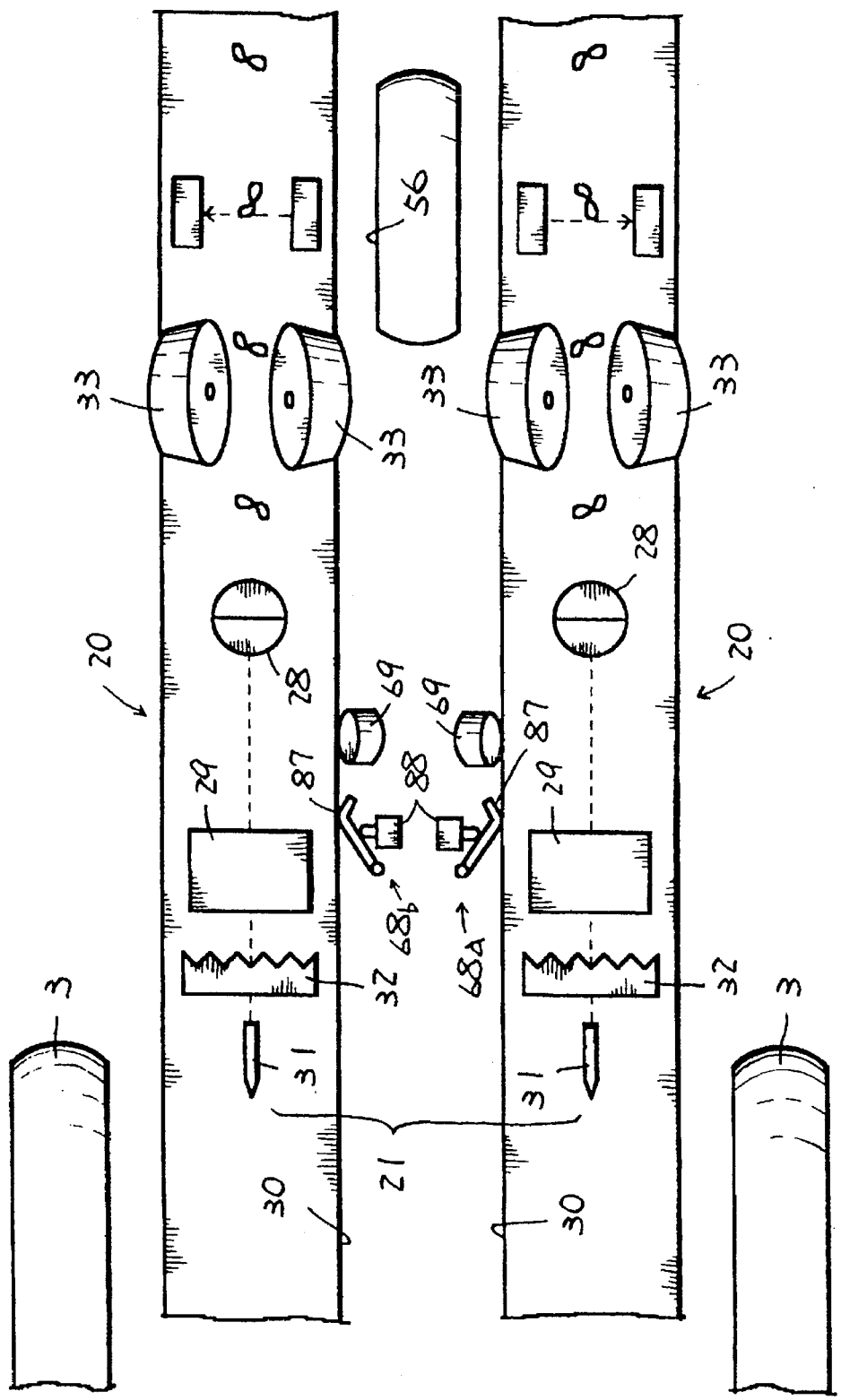
FIG. 11 is a plan view of the planting units.

As shown also in FIG. 10, a pair of left and right planting units 20 are mounted on the tool bar 19 so as to provide a double-row planter 21 (see FIG. 11). Each planting unit 20 comprises: a unit frame 22; a seedling rack 25; a pair of picking pawls 27 cooperating with each other in a manner like a Japanese table folk ('hashi') for taking seedling pots out of the rack; a hopper-shaped planting pawl 28 for planting the seedling pots one by one in a ridge 30; a leveling roller 29 disposed in front of the planting pawl; a ridge cutter 31 disposed in front of the roller 29; a smoothing float 32 interposed between the roller 29 and the cutter 31; a pair of covering-up rollers 33 disposed in rear of the planting pawl 28; a auxiliary or branched transmission 34 for driving the planting unit 20; and a train of power-transmitting blocks 35, 36 and 37 (see FIG. 6) operatively connected one to another and also to the transmission 34. The seeding rack 25 is guided along an upper and lower rails 23 and 24 (see FIG. 5) so as to reciprocate fore and aft relative to the frame 22. The picking pawls 27 take the seedling pots one by one from a tray 26 (see FIGS. 4 and 6) formed along an inner side of the seedling rack 25. The leveling roller 29 levels off the ridge surface, before the seedlings are inserted in and along a middle zone in the ridge by the planting pawl 28. The cutter 31 forms a groove in the middle zone, before the latter is scraped with the smoothing float 32 (FIG. 11). The covering-up rollers 33 will put soil towards the planted seedling pots.

Power will be transmitted from the branched transmission 34 to all the driven parts so that the pair of the picking pawls 37 as well as the planting pawl 28 move on and along their own looped routes, respectively, to thereby pick up the seedling pots and plant them in the ridge. On the other hand, the seedling rack 25 reciprocates fore and aft, and the seedling tray 26 continues to run obliquely and downwards. Therefore, the seedling pots are caused to move not only fore and aft but also vertically at the same time, thus enabling a continuous planting of them at regular intervals along the ridge.

As shown in FIGS. 6 to 9, and as best seen in FIG. 9, two rigid plates each having ends bolted 39 to each other fit on the tool bar 19 to form sleeves 38 slidable therealong. These sleeves will be controlled to take any desired offset or transverse position. Bearing collars 40 each having an ear welded to each sleeve 38, so that a hitch plate 41 (see FIG. 7) as one part of the unit frame 22 is attached to the collars 40 to be rotatable therewith. Each branched transmission 34 is interposed between and fixed to the inner and outer collars 40 (see FIG. 8), also rotatably together with same. The T-shaped gear case 12 and the pairs of the collars 40 are in a coaxial alignment with each other and extend in parallel with the tool bar 19. A transverse power-take-off shaft (viz. PTO shaft) 42 that extends through the gear case 12 and the collars 40 is rotatably supported thereby. A principal PTO shaft 43 protruding rearward from the transmission case 8 is operatively connected to transverse PTO shaft 42, through a universal joint 44 (see FIG. 7). Thus, an output from the engine of tractor 1 will be transmitted to the transverse PTO 42, which in turn drives the branched transmissions 34 for the planting units.

A transverse rail 45 is fixed on the linking frames 15 and extends in parallel with the tool bar 19, and rollers 47 are carried by the upper ends of control bars 46. Those bars 46 have feet pivoted to the collars 46, and rollers 47 engaging with the longitudinal cavity of transverse rail 45 are displaceable along same. A tie bar 48 connects the hitch plate 41 to the control bar 46 (see FIGS. 7 and 8), such that the unit frame 22 can rock up and down around the transverse PTO shaft 42 when the piston rod 17 extends from or is retracted into the further hydraulic cylinder 16. On the other hand, the two sleeves 38 each having an ear and respectively corresponding to the left and right ridges are fixed to transverse tie bars 50 (see FIG. 9). Those ears rigidly engage with selected longitudinal portions of those tie bars 50, so that the distance between sleeves 38 is adjustable. Inserted between the tie bars 50 is a sliding frame 49 having opposite ends secured thereto. A transverse hydraulic cylinder 51 and its piston rod 52 operatively intervene between the opposite ends of the sliding frame 49 so as to adjust transverse position thereof. In response to the piston rod 52 extending from or being retracted into the cylinder, the left and right planting units 20 will be forced to the left or to the right in unison with each other and relative to the tool bar.

Figure 5:
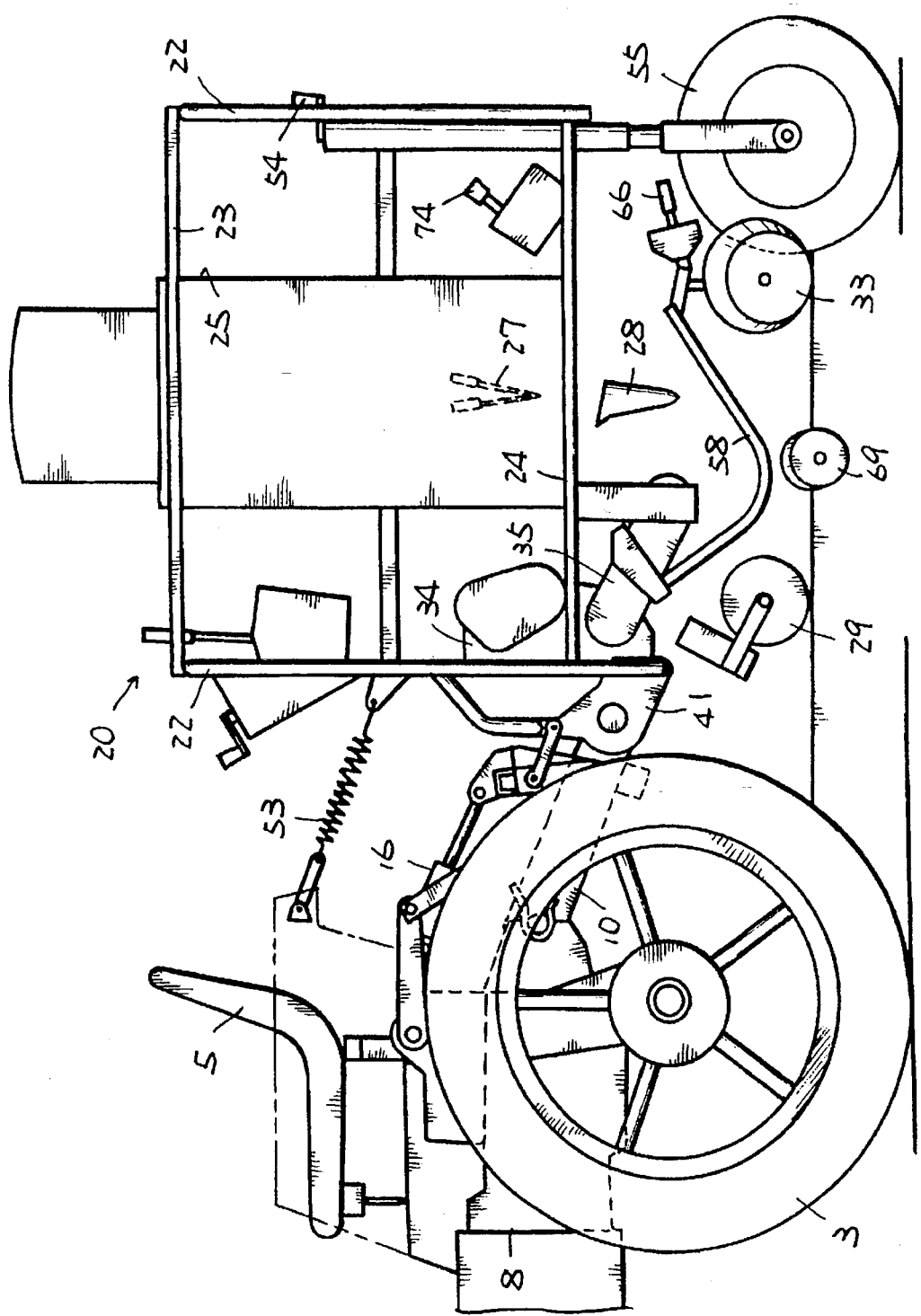
FIG. 5 is an enlarged side elevation of the transplanter.
Figure 6:
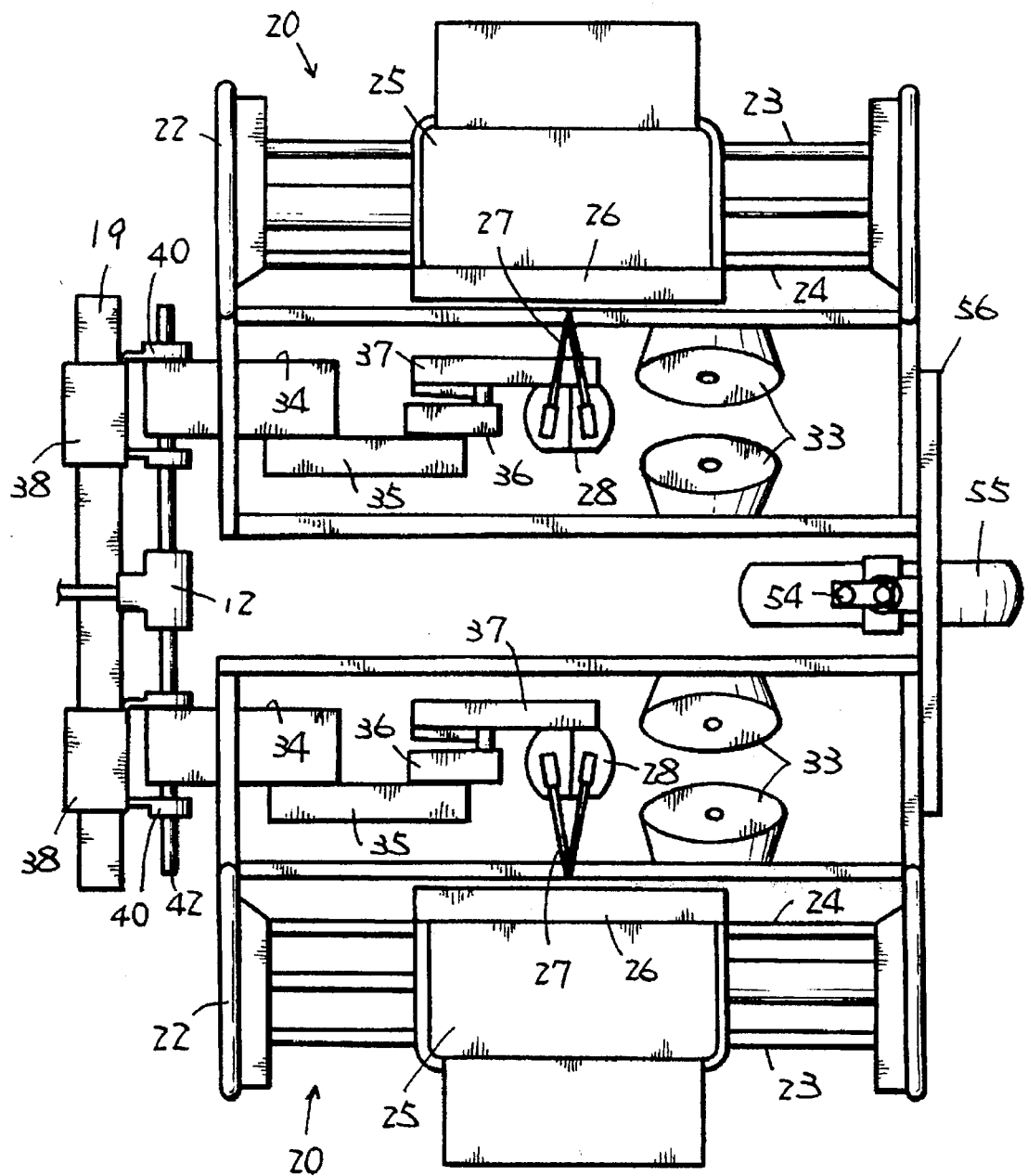
FIG. 6 is an enlarged plan view of the transplanter.
Figure 15:
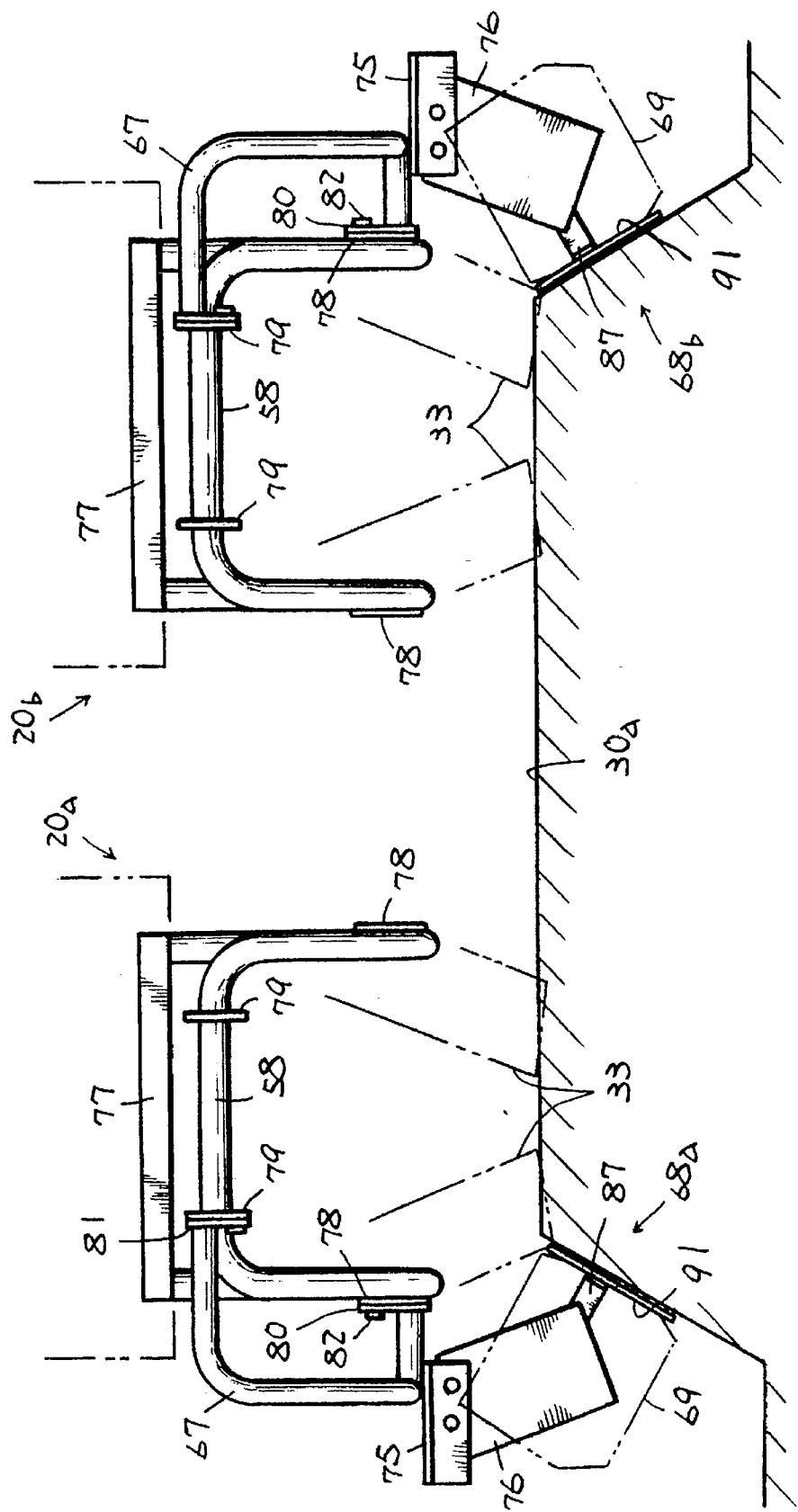
FIG. 15 is a rear elevation of the ridge sensors in another mode of use.
Figure 16:
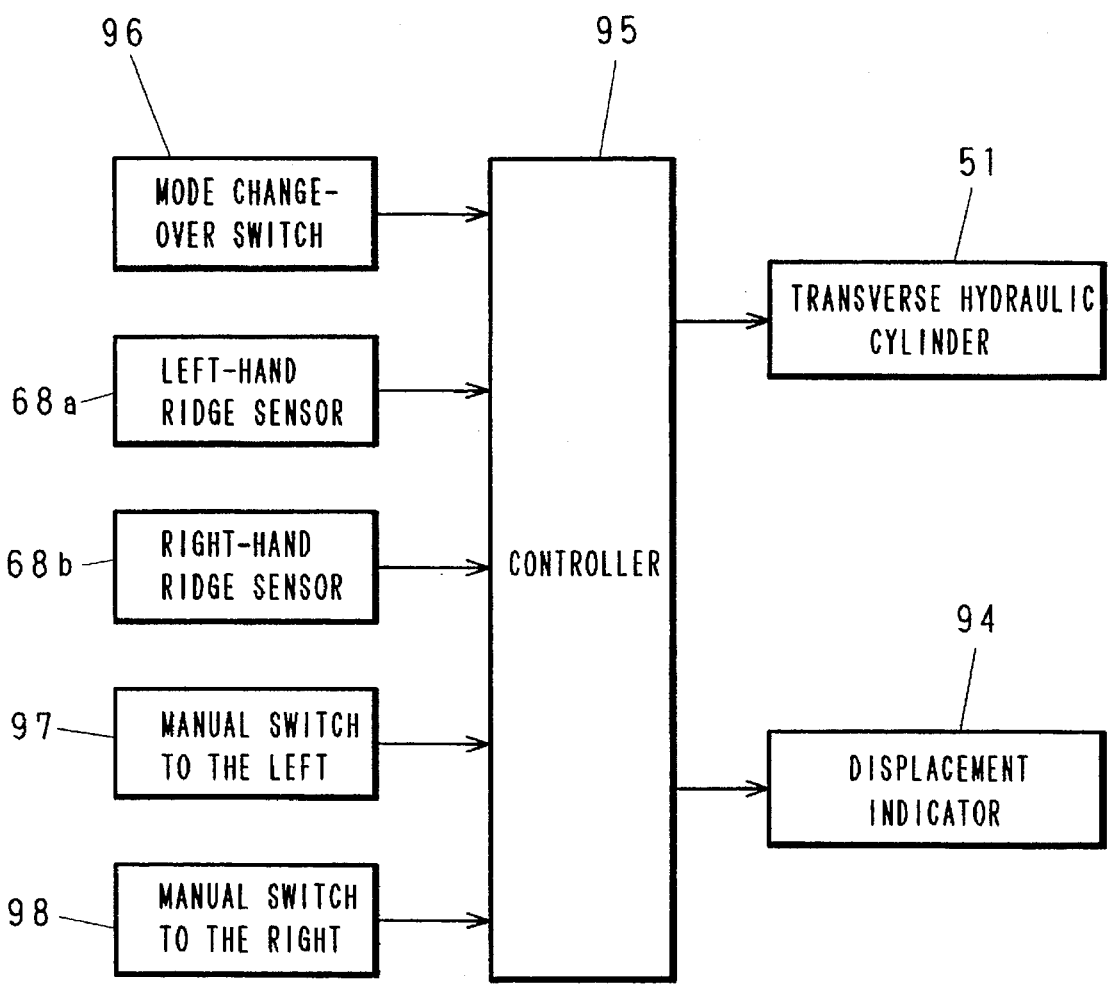
FIG. 16 is a block diagram illustrating the relationship between a controller and relevant elements.

As shown in FIGS. 5, 7 and 8, coiled springs 53 extending fore and aft connect the frontal ends of unit frames 22 to the rear end of tractor 1. A connecting bar 56 is fixed to the rear ends of the unit frames, and a freely rotatable and ground-engaging gauge wheel 55 is attached to the connecting bar. A handle 54 is operable to adjust the vertical distance between the frames 22 and the gauge wheel 55. The branched transmissions 34 fixed to the unit frames 22 have output shafts 57 (see FIG. 10), and the power-transmitting blocks 35 for driving the planting pawls are operatively connected to and rockable about those output shafts 57. Characteristically provided in the present invention are sensor frames 58 extending fore and aft and each having a frontal end secured to said block 35. A leveling frame 60 is connected by parallel links 59 to a frontal end of the sensor frame 58. The leveling roller 29 mentioned above is rotatably carried by an arm 61 protruding rearward from the leveling frame 60. A longitudinal arm 63 extending fore and aft to rotatably carry with its middle portion the pair of covering-up rollers 33 has a frontal end rotatably engaging with a pivot 62. This pivot 62 is attached to the sensor frame 58 at a portion near its rear end. A rod 65 connects the parallel links 59 to the arm 63, and a manual lever 66 is connected to the latter so as to simultaneously lift or simultaneously lower the leveling and covering-up rollers 29 and 33. Thus, a desired depth of planting the seedlings may be selected by changing the planting pawl 28 in its height above the ground. As shown in FIGS. 10 and 15, a sensor arm 67 fixed to a middle portion of the sensor frame 58 holds in place a ridge sensor 68 and a guide roller 69.

Also shown in FIG. 10 is a planting depth sensor consisting of a lowering microswitch 70a, a raising microswitch 70 and an upper limit microswitch 71. A sensor arm 73 connected by a vertical rod 72 to the sensor frame 58 will close any one or two of those microswitches. A control lever connected to the arm 73 is operable to select a pressure at which the covering-up rollers 33 will press the soil towards the root of each seedling planted.

Figure 12:
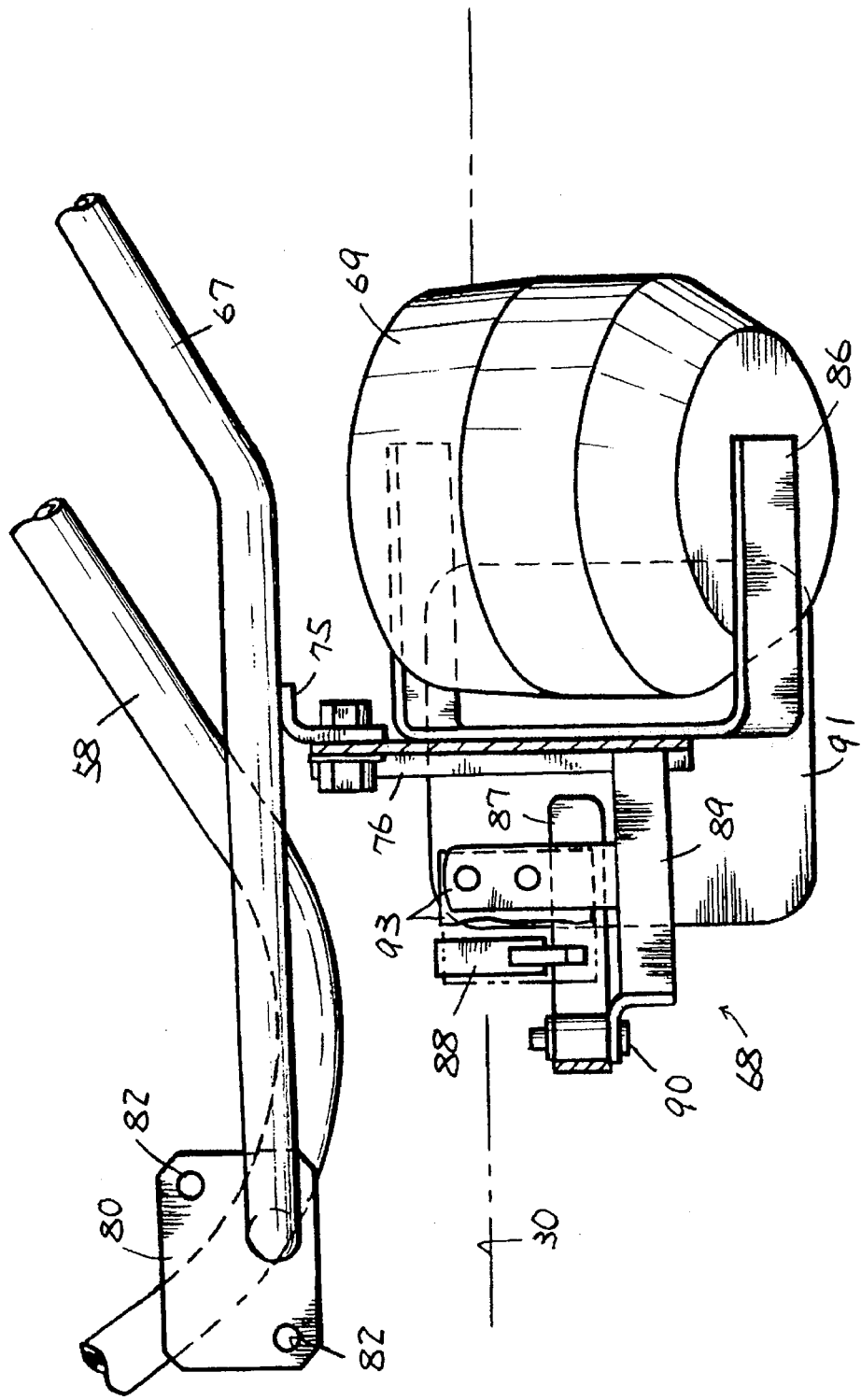
FIG. 12 is a side elevation of one of ridge sensors attached to transplanter.

FIGS. 1, 12 and 15 show that a bracket 75 rigidly secures a sensor supporter 76 to the sensor arm 67, wherein the ridge sensor 68 and the guide roller 69 form an assembly attached to the supporter and integral therewith. As best seen in FIG. 1 compared with FIG. 15, the assemblies of said ridge sensor 68 and guide roller 69 are capable of being arranged either at one of their positions located inside the respective planting units 20a and 20b, or at the other located outside the latter.

The sensor frame 58 generally U-shaped (see FIG. 10) to which the sensor arm 67 is secured has an obliquely upright leg fixed to a transverse base 77, which in turn is attached to the lower face of the power-transmitting block 35. Forward seats 78 are disposed symmetrically (see FIG. 10) at outer sides of the middle portions of said the sensor frame 58. Rearward seats 79 are likewise disposed symmetrically at the outer sides of rearward portions of frame 58. Plate members 80 and 81 welded or otherwise secured to the frontal and rear ends of the sensor arm 67 are bolted at 82 to the seats 78 and 79, respectively.

Figure 13:
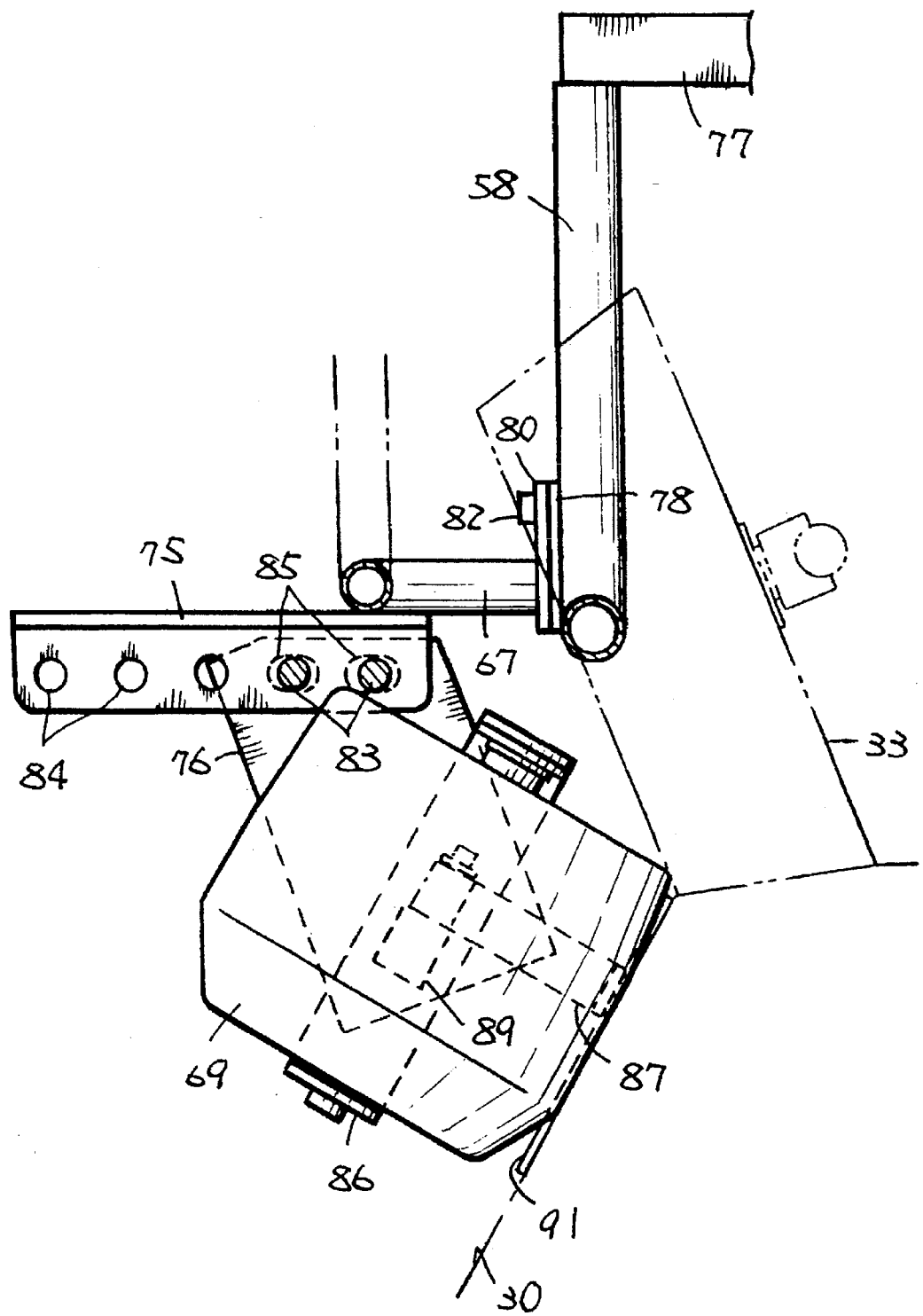
FIG. 13 is a rear elevation of the ridge sensor.

The bracket 75 for sensor supporter is fixedly attached to the lower face of the sensor arm 67, as mentioned above (see FIG. 13), and has round holes 84 at proper intervals. Correspondingly, the sensor supporter 76 has elongate apertures 85. Thus, the sensor supporter bolted at 83 to the bracket 75 is adjustable with respect to its transverse position.

Figure 14:
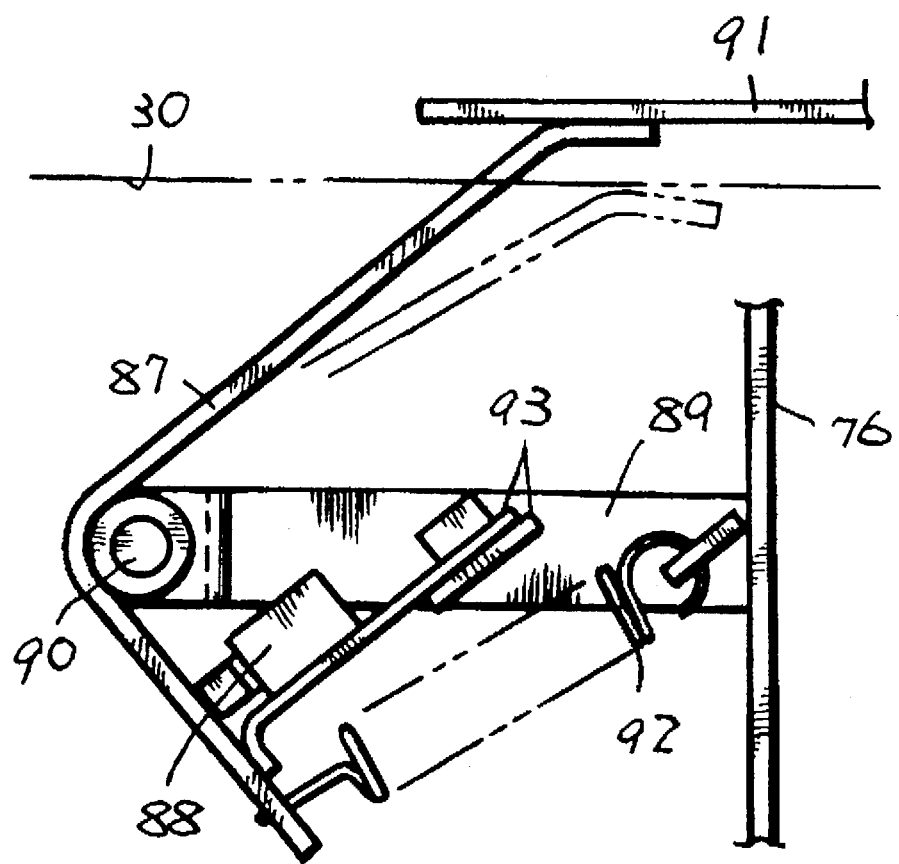
FIG. 14 is a plan view of he ridge sensor.

A roller holding member 86 (FIG. 12) for rotatably holding the guide roller 69 is secured to the rear face of sensor supporter 76. The ridge sensor 68 consists of a ridge detecting shoe 87 and a ridge detecting microswitch 88, both attached to a forwardly protruding bracket 89 secured to the frontal face of said supporter 76. The ridge detecting shoe 87 is generally L-shaped in plan view (FIG. 14), and its forward end is rockably connected by a pivot 90 to the bracket 89 (FIGS. 12 and 14). A ridge contacting plate 91 located outside the free end of the shoe 87 is secured to an end of the sensor supporter 76 in a manner not shown. In operation, the ridge contacting plate 91 will be kept in a sliding contact with an upper region of a side slope of the ridge 30, so that the shoe's free outer end does not directly contact the ridge but is pressed against the inner face of ridge contacting plate 91. The inner end of said shoe 87 is always urged by a coiled spring 92 in a direction such that the ridge detecting microswitch 88 may usually be kept closed to transmit an 'OFF' signal. A switch supporter 93 holding the microswitch 88 extends from the bracket 89. As the plate 91 comes into a sliding contact with the ridge 30 (see FIG. 14), the ridge detecting shoe 87 will swing about the pivot 90 in another direction such that the ridge detecting microswitch 88 is opened to transmit an 'ON' signal indicating the ridge contacted by said shoe.

In one mode of using the transplanter, each of left and right planting units 20a and 20b will plant seedlings in one ridge, as FIG. 1 illustrates. Each pair of the ridge sensor 68 and the guide roller 69 will be arranged inside the planting unit. The left-hand ridge sensor 68a will face and detect the right side slope of left-hand ridge, with the right-hand ridge sensor 68b simultaneously facing and detecting the left side slope of the right-hand ridge. In another mode, both the left and right planting units 20a and 20b will plant seedlings in one and the same ridge, as FIG. 15 illustrates. In this case, each pair of the ridge sensor 68 and the guide roller 69 will be arranged outside the planting unit. The left-hand ridge sensor 68a will face and detect the left side slope of the one ridge, with the right-hand ridge sensor 68b facing and detecting the right side slope of said one ridge. In still another mode, each pair of the ridge sensor 68 and guide roller 69 are disposed outside the left or right planting unit 20a or 20b. Further, three or more planting units 20 may be mounted on the trailer, wherein the side slope of any one ridge, or more than two side slopes of those ridges, may be detected with the sensor(s) and guide roller(s).

A controller 95 is provided herein for the transplanter. This controller is designed to give command signals to the transverse hydraulic cylinder 51 and also to an indicator for indicating any offset of the planting units 20a and 20b relative to the ridge 30. The controller 95 comprises a selection switch 96 for converting manual control mode to automatic control mode, or vice versa. An indicator 94 electrically connected to the controller 95 indicates the position of those planting units 20a and 20b offset to the left or offset to the right. Signals from the left-hand ridge sensor 68a and the right-hand one 68b will be input to this controller, together with those from a manual switch 97 for displacement of the transplanter to the left and another manual switch 98 for displacement to the right. The planting units 20 mounted on the trailer pulled by the tractor may be controlled by the controller 95, based on the signals from the ridge sensors 68, as to the transverse position of those units relative to the ridge 30, in any appropriate or desired manner.

Figure 17:
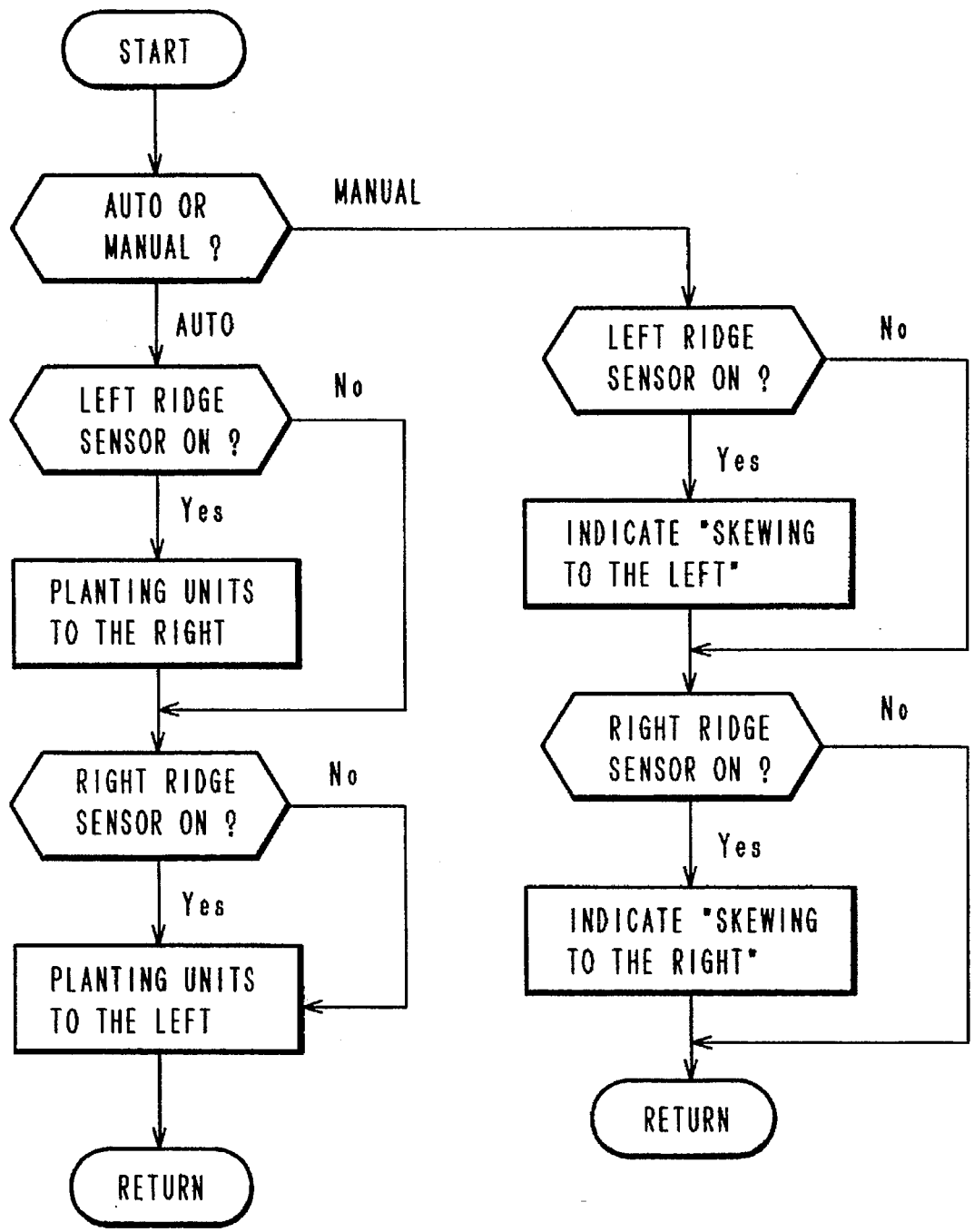
FIG. 17 is a flow chart showing the control executed in and by the controller.

In the case wherein the left-hand and right-hand ridge sensors 68a and 68b are arranged inside the left right planting units 20a and 20b, respectively, the control of this system will be effected in a manner briefly shown in FIG. 17. When in the automatic control mode the left-hand sensor 68a is turned on by the left side ridge, the planting units 20a and 20b will be displaced to the right. When the right-hand sensor 68b is turned on by the right side ridge, the planting units will be displaced to the left. Thus, the seedlings will be planted automatically in a correct zone, for instance in a middle longitudinal zone of the ridge 30.

When in manual control mode the left or right-hand ridge sensor 68a or 68b is turned on due to the displacement of the left and right planting units 20a and 20b to the left or to the right, the indicator 94 will indicate such an offset of those planting units. An operator may maneuver the tractor by the steering wheel 4 so as to correct the position of said units 20a and 20b relative to the ridges. Alternatively, he or she may use the manual switches 97 and 98 to cause the transverse hydraulic cylinder 51 to extend or retract its piston rod, for the same purpose.

In summary, the transplanter comprises the planting units 20 mounted on the trailer to be displaceable sideways relative thereto, the pair of left and right ridge sensors 68 attached to the planting units, and the control means 90 for moving the planting units 20 to slide transversely relative to the trailer. The signals from the sensors 68 are used in said means 90 to automatically adjust position of the planting units into alignment with longitudinal ridge zones to be planted with seedlings. In operation, an operator can maneuver the tractor 1 easily to cause the trailer to run approximately along the ridges, whereby the seedlings are planted correctly without pushing down those which have been planted, and without damaging the heads of vegetables such as cabbages. Adjacent rows of any other vegetables will also be protected from damage when a ground between these rows is cultivated using plows in place of the planting units.

The transplanter provided herein from another aspect comprises also the planting units 20, the left and right inside ridge sensors 68 attached thereto and capable of detecting inner slopes of adjacent ridges 30. Transverse position of the planting units is controlled based on signals from the ridge sensors so that said units correctly follow the longitudinal ridge zones where seedlings are to be planted, even if the trailer slightly skews. Seedlings can thus be planted accurately in any desired zone on each ridge. In contrast with ridge sensors detecting outer side slopes of adjacent ridges, the ridge sensors in this case make a more moderate response to such a temporary change in position of said unit, thus avoiding the so-called 'hunting'. The ridge sensors in this case are located near the center of the trailer, so that they will be protected well from any obstacles that may be present near the sides of said trailer.

The transplanter provided herein from still another aspect, the pair of left and right outside ridge sensors 68 are attached to the planting units 20 so as to detect outer side ridge slopes, wherein transverse position of the planting units is also controlled based on the signals from the ridge sensors. In operation, the ridge sensors 68 located remote from each other in this case do cooperate with each other to detect even a slight sideways offset of the planting units. The planting units makes a so quick response as to be controlled more sharply in position. Maintenance of those ridge sensors located away from the trailer body is easy.

The transplanter provided herein from yet still another aspect comprises the planting units also mounted on the trailer and displaceable sideways relative thereto. The pair of left and right ridge sensors 68 attached to the planting units are capable of being converted in their position, between one position to detect inner slopes and another position to detect outer slopes of the adjacent ridges. The transverse position of planting units is also controlled based on signals from the ridge sensors, to correctly follow the longitudinal zones where seedlings are to be planted. Versatility of the ridge sensors is remarkably enhanced in this case.

What is claimed is:

1. A transplanter comprising:
   at least one planting unit mounted on a trailer and displaceable sideways relative to the direction of travel of said trailer;
   a pair of left and right ridge sensors attached to said planting unit; and
   a control means for moving said planting unit transversely relative to the direction of travel of said trailer in response to signals transmitted from said sensors to automatically adjust the positioning of said planting unit into alignment with ridges to be planted with seedlings.

2. A transplanter as defined in claim 1, wherein said control means comprises a transverse oil-hydraulic cylinder and a controller for receiving signals from said ridge sensors and giving command signals to said transverse oil-hydraulic cylinder, thereby actuating said transverse oil-hydraulic cylinder to adjust the transverse position of said planting units relative to the direction of travel of said trailer.

3. A transplanter comprising:
   at least one planting unit mounted on a trailer and displaceable sideways relative to a for/aft line bisecting said trailer;
   a pair of left and right inside ridge sensors attached to said planting unit; and
   said inside ridge sensors comprising means for detecting inner ridge slopes facing one another and belonging to adjacent ridges which have longitudinal zones and extend in parallel with each other, wherein the transverse position of said planting unit is controlled by signals transmitted from said inside ridge sensors while said trailer is moving, whereby said planting unit is caused to follow the longitudinal zones where seedlings are to be planted.

4. A transplanter as defined in claim 3, further
   comprising a transverse oil-hydraulic cylinder and a controller for receiving said signals transmitted from said inside ridge sensors for giving command signals to said transverse oil-hydraulic cylinder, thereby actuating said transverse oil-hydraulic cylinder to adjust the transverse position of said planting units relative to said for/aft line bisecting said trailer.

5. A transplanter comprising:
   at least one planting unit mounted on a trailer;
   a pair of left and right outside ridge sensors attached to said planting unit; and
   said outside ridge sensors comprising means for detecting outer side slopes of ridges located at opposite sides of a plurality of adjacent ridges which have longitudinal zones and extend in parallel with each other, wherein the transverse position of said planting unit relative to a line running the length of said trailer is controlled in response to signals transmitted from said outside ridge sensors while said trailer is moving, whereby said planting unit is caused to follow the longitudinal zones where seedlings are to be planted.

6. A transplanter as defined in claim 5, further comprising a transverse oil-hydraulic cylinder and a controller for receiving said signals transmitted from said outside ridge sensors for giving command signals to said transverse oil-hydraulic cylinder, thereby actuating said transverse oil-hydraulic cylinder to adjust the transverse position of said planting units relative to said line running the length of said trailer.

7. A transplanter comprising:

at least one planting unit mounted on a trailer;

a pair of left and right ridge sensors attached to said planting unit; and said ridge sensors being switchable over between a first position for detecting ridge inner slopes facing one another and belonging to adjacent ridges and a second position for detecting ridge outer slopes located on opposite sides of ridges which have longitudinal zones and extend in parallel with each other, wherein the transverse position relative to a line running the length of said trailer of said planting unit is controlled by signals transmitted from said left and right ridge sensors while said trailer is moving, whereby said planting unit is caused to follow the longitudinal zones where seedlings are to be planted.

8. A transplanter as defined in claim 7, further comprising a transverse oil-hydraulic cylinder and a controller for receiving said signals transmitted from said left and right ridge sensors for giving command signals to said transverse oil-hydraulic cylinder, thereby actuating said transverse oil-hydraulic cylinder to adjust the transverse position of said planting units relative to said line running the length of said trailer.

* * * * *